(12) United States Patent
Sweet

(10) Patent No.: US 7,949,606 B1
(45) Date of Patent: May 24, 2011

(54) INTELLECTUAL PROPERTY BROKERAGE SYSTEM AND METHOD

(76) Inventor: William Sweet, Silver Spring, MD (US)

( * ) Notice: Subject to any disclaimer, the term of this patent is extended or adjusted under 35 U.S.C. 154(b) by 1569 days.

(21) Appl. No.: 10/847,662

(22) Filed: May 18, 2004

Related U.S. Application Data

(63) Continuation-in-part of application No. 09/727,489, filed on Dec. 4, 2000, now abandoned.

(60) Provisional application No. 60/168,629, filed on Dec. 3, 1999, provisional application No. 60/500,887, filed on Sep. 8, 2003.

(51) Int. Cl.
*G06F 21/00* (2006.01)

(52) U.S. Cl. ............... 705/52; 705/51; 705/59; 705/901; 705/902; 705/904; 705/908; 705/911

(58) Field of Classification Search ............. 705/52
See application file for complete search history.

(56) References Cited

U.S. PATENT DOCUMENTS

| | | | | |
|---|---|---|---|---|
| 5,561,763 A * | 10/1996 | Eto et al. | | 714/35 |
| 5,823,872 A * | 10/1998 | Prather et al. | | 463/6 |
| 6,058,417 A | 5/2000 | Hess et al. | | |
| 6,240,396 B1 | 5/2001 | Walker et al. | | |
| 6,247,130 B1 | 6/2001 | Fritsch | | |
| 6,292,788 B1 | 9/2001 | Roberts et al. | | |
| 6,308,887 B1 * | 10/2001 | Korman et al. | | 235/379 |
| 6,343,738 B1 * | 2/2002 | Ogilvie | | 235/381 |
| 7,191,153 B1 * | 3/2007 | Braitberg et al. | | 705/51 |
| 7,263,528 B2 * | 8/2007 | Haff et al. | | 707/622 |
| 2005/0071481 A1 * | 3/2005 | Danieli | | 709/229 |
| 2006/0161635 A1 * | 7/2006 | Lamkin et al. | | 709/217 |

* cited by examiner

*Primary Examiner* — Andrew J. Fischer
*Assistant Examiner* — Joshua Murdough
(74) *Attorney, Agent, or Firm* — Cahn & Samuels, LLP

(57) ABSTRACT

Intellectual property is sold to buyers through a kiosk. The kiosk provides users with the ability of located desired content on a seller's computer. When a user located the desired intellectual property, a payment transaction is initiated. When the payment transaction is complete, the seller transmits the intellectual property to the kiosk. The kiosks also preferably include production facilities that transfer the owner's intellectual property onto a permanent medium and/or presentation facilities that present the owner's intellectual property on a one-time basis.

6 Claims, 7 Drawing Sheets

INTELLECTUAL PROPERTY BROKERAGE SYSTEM AND METHOD

This application is a continuation-in-part of application Ser. No. 09/727,489, filed Dec. 4, 2000, which claims the benefit of U.S. Provisional Application Ser. No. 60/168,629, filed Dec. 3, 1999. The entirety of that provisional application and application Ser. No. 09/727,489 are incorporated herein by reference. This application claims the benefit of U.S. Provisional Application No. 60/500,887 filed Sep. 8, 2003 which is herein incorporated by reference.

I. BACKGROUND OF THE INVENTION

1. Field of the Invention

The invention relates to the distribution of intellectual/intangible property generally and more particularly to a system and method for brokering the electronic transfer of intellectual/intangible property.

2. Discussion of the Background

The current system for the sale and distribution of intellectual/intangible property is characterized by the delivery of physical media imprinted with a copy of the intellectual/intangible property. As used herein the terms "intellectual property" and "intangible property" are interchangeable and are defined as digital information or content. Examples include, but are not limited to digitally stored music, film, video, text and photographs.

An elaborate distribution chain is employed to move physical media from the factory to the distributor to the retail store. During the 1970s this model was updated by storing digitized content on central computers and then downloading the content to kiosks for copying onto media. This client/server model is characterized by a dominant central server and subordinate client kiosks. An updated version of the client/server model utilizes the Internet with the web server dominating the model.

The associated business process mirrors the hierarchical and centralized technology. Participation in the client/server business process requires permission from the central authority. Intellectual property content storage is limited to central authority-designated servers. The current business processes have large capital requirements, resulting in oligopolistic organization of the distribution of music and movies. The resulting business organization has reduced revenue to the creators of intellectual property and reduced choice at the retail level.

What is needed is a method for the sale and distribution of intellectual property that reduces capital requirements, increases revenue to the creators of intellectual property, and increases choice at the retail level.

Retail distribution of dry goods is a complex network of transportation, warehouses and intermediary organizations that efficiently deliver goods from multiple manufacturers to retail stores for customer selection and purchase. This complex system presents to the customer, in one retail location, a multitude of choices from a wide variety of sources.

Likewise, digital distribution systems of intellectual property content have the potential to offer the same multiplicity of choices from a wide variety of sources to the retail customer. Presently however, the current method of digital distribution has come to mean the download and sale of intellectual property from a particular web site to the consumer's home PC. On Line music sales web sites generally distribute inventory from their own sites, or partner sites through hard coded html links. In store, retail point-of-sale digital distribution through in store customer kiosks applies a similar model. Content available through the kiosk is limited to content hosted by the kiosk vendor. These methods generally preclude the possibility of discovery, bundling and cross selling from unknown suppliers.

The current methods implement tight coupling of content supply with the digital distribution channel, whether the channel is a web site or in-store kiosk. These methods reflect their underlying client/server architecture with preprogrammed, hard coded links to known, pre-approved sources and partners. This architecture requires intervention of Information Technology personnel to integrate new sources. This business method requires explicit pre approval for integration of other sources.

What is needed are systems that decouple the content source from the digital distribution channel. This requires new, open, non-client/server architecture, business process and data networks. Developing this new type of open data network and business process is a significant technical, legal and social issue. Digital content comes on a variety of computer equipment, each with different operating systems, programming languages, communication protocols, and a proprietary interface into their system. The digitized content itself comes in a variety of codec, encryption, compression and digital rights management schemes. Legally, each content owner has different pricing, usage and business rules. Delivery to client tier technology, whether a consumer home PC or a retail point-of-sale kiosk, includes an equally broad array of computer equipment, operating systems, and browsers.

II. SUMMARY OF THE INVENTION

The aforementioned needs are met to a great extent by the present invention which provides a method for the sale and distribution of intellectual property in which intellectual property stored on an intellectual property owner's computer is sold to buyers through a kiosk. The kiosk provides users with the ability to locate desired content on a seller's computer. In one embodiment, when a user locates the desired intellectual property, a payment transaction is initiated through an administration server, which brokers the transaction. In another embodiment, when a user locates the desired intellectual property, a payment transaction is initiated which is brokered through system software on the kiosk or seller machine and which does not require a centralized administration server. When the payment transaction is complete, the seller transmits the intellectual property to the kiosk. The kiosks preferably include production facilities that transfer the owner's intellectual property onto a permanent medium such as paper, CD-ROM, DVD, VCR, etc., and/or presentation facilities that present the owner's intellectual property on a one-time basis. The kiosks may be located in retail stores, factory floors, in other public areas-, or in private homes and may be attended or unattended. The method and system provides any seller of intellectual property with a distribution network without the high entry barriers associated with known methods of intellectual property distribution. The system and method also benefits retailers of intellectual property as the necessity of maintaining inventories of media imprinted with intellectual property is eliminated. The system also benefits industrial users of intellectual property, as it will reduce the cost of production.

This invention implements a federated, peer-to-peer network of point-of-sale kiosks to solve existing business problems. Federated meaning heterogeneous kiosk computer technologies communicating in trusted relationships across unknowns and unrelated ownership and administration boundaries. Peer-to-peer meaning: dynamic, automated discovery of new peers; trusted and content sharing directly between parties previously unknown to each other; unassisted joining and leaving of the network.

Content location and transaction processing administration is virtualized and can be located on variety of types of machines, running a variety of technologies and offered by a variety of entities. The system automatically changes to reflect the dynamic change in content location and changing relationships among entities. Content is stored on the kiosk, on the seller's machine or dedicated content service providers. Administrative functions may be off loaded from the kiosk to dedicated Administrative server.

In keeping with an aspect of the invention, trust and standardization is achieved using the open architecture. Open systems have become an important business method and are described extensively in the literature. Making the system hardware and software design public and other steps in the present methods creates an open system. The open architecture is an important step in this method to establish trust and standardization.

Another feature included in the present method for the purpose of establishing trust and confidentiality is public key encryption. Federation of registration enables peers to establish trust with one machine and have that trust relationship accepted system wide. The Content viewed before purchasing, and then purchased by customers through the kiosks is understood to be a complete and accurate copy of the content offered for sale by Sellers and residing on the Seller's computer. Content is preferably transported across the network in an encrypted and compressed format. At the kiosk the content is uncompressed then decrypted in either read only, or write to media mode.

III. BRIEF DESCRIPTION OF THE DRAWINGS

The aforementioned advantages and features of the present invention will be more readily understood with reference to the following detailed description and the accompanying drawings in which.

IV. DETAILED DESCRIPTION

In the following detailed description, a plurality of specific details, such as types of storage media and operating systems, are set forth in order to provide a through understanding of the present invention. The details discussed in connection with the preferred embodiments should not be understood to limit the present invention.

It should be understood that references in the following detailed description to intellectual properly or content also refer to licenses (such as tickets) for exhibitions or presentations of intellectual property. These exhibitions or presentations may be live (e.g., a concert) or reproduced (e.g., a movie).

Figure 1:
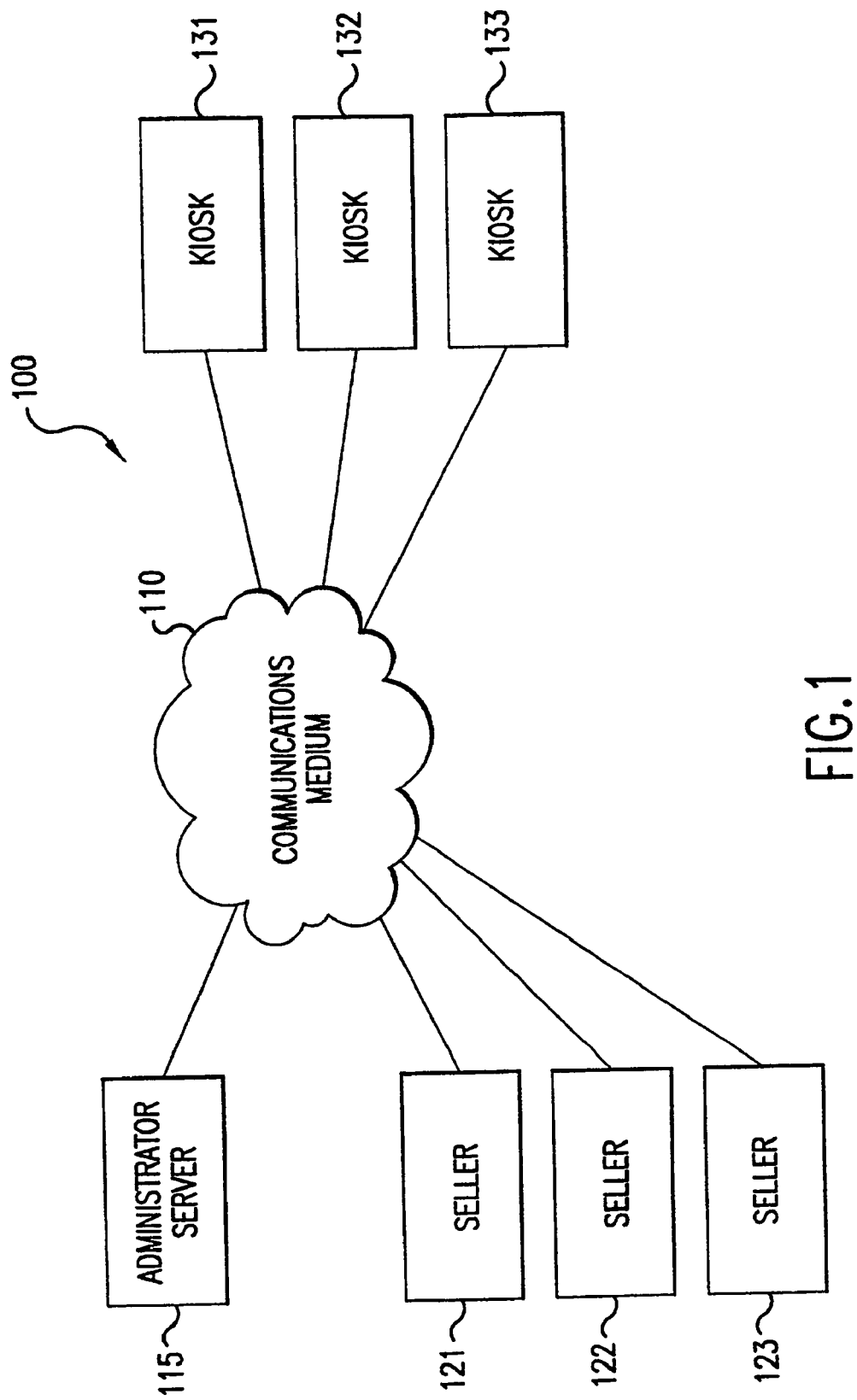
FIG. 1 is a block diagram of a brokerage network according to a first preferred embodiment of the present invention.

FIG. 1 is a block diagram of an intellectual property brokerage system according to a first preferred embodiment 100 including an administration server 115, a plurality of kiosks 131-133 and a plurality of seller computers 121-123 connected to each other via a communications network 110. In preferred embodiments, the system 100 is implemented using an "open standards" architecture. The communications network 110 is preferably implemented using TCP/IP over a public packet switched network such as the Internet. Private networks and other protocols may also be used.

The system software can be implemented in any of several computer languages and any of several system design architectures. Alternative architectures including a central server resident application; applications distributed between various buyer and seller machines; applications distributed though one or more applets.

Alternate architectures also include distribution of content between: Seller machine and kiosk; kiosk and kiosk; Seller content storage service provider and kiosk; central serverless Networked Attached Storage appliance farm and kiosks The system facilitates commerce through the computers of buyers and sellers. Data communication may be implemented through any of several protocols. Buyers include consumers; merchants; distributors and other intermediaries and end users of data. Sellers include: creators; owners; agents; intermediaries and other sources of data.

Users of the system can be categorized into several roles. These roles may be fulfilled by individuals or organizations. Sellers authorize and make available content for sale. A Merchant is the operator and provider of a kiosk in a retail environment. Merchants may employ retail clerks to whom the Merchant delegates day-to-day kiosk operations and customer service. A Merchant may act as a type of intermediary by entering into a contract with one or more Sellers where the Merchant agrees to host seller content on his kiosk and to make such content available for transfer and sale to other kiosks. An Administrator provides administrative services to the system. Administrators may include Merchants who implement administrative functionality on their kiosk. The System Manager is responsible for over all operation of the system. The System Manager may delegate various administration and system management functions to Administrators. Customers buy content for end use. A Service Provider provides information services on behalf of other participants. Specialized Service Providers may store and host content on behalf of sellers Data includes various types of digital content including: multimedia; audio; video; text; other types of present and future digitizeable content and combinations thereof. Media includes CD, DVD, video tape; audio tape; paper; hard and floppy disk drives; view screens; consumer player devices and other present and future media. Computes include various types of present and future information processing and storage devices.

Data is secured using information security technologies well know in the art such as: authorization, authentication, passwords; encryption; synchronous and asynchronous keys; digital certificates; message digests and other techniques.

Information about system participants, participating computers and content offered for distribution is contained in a Registration repository. The Registration Repository, or Registry, is any type of data repository and associated software to read, update and maintain registration data. The Registration Repository contains descriptor records where the descriptor records contain the descriptions and attributes of buyers, sellers and seller's content.

The system is a system and method of distributing intellectual property from property owners to consumers through retail point-of-sale customer kiosks. The Customer Kiosk is specially designed to locate, display and duplicate content. Content duplication may be to optical media using high volume, robotic duplicators. Unlimited content and key storage is provided to each kiosk through Direct Attached Storage, Network Attached Storage and peer-to-peer connections with storage devices on remote kiosks or Seller devices. The kiosk is preferably configured for high throughput for retail duplication and has little use outside of a retail environment.

The Customer Kiosk is an open architecture where the design specifications and functional version of the operating software is made available to the public. The open architecture is an important step in the method of creating a trusted business environment. The modular software design permits implementation of the kiosk api on a wide variety of computer platforms. The open architecture and modular software design permits kiosks of different computer architectures, operated and administered by different organizations to communicate and share information. The overall system creates an environment for cooperation among differing networks of kiosks.

Under one embodiment, each kiosk implements several software components. The Kiosk Operations software provides the basic customer interface and content duplication functionality. The Registry provides a repository of content and system descriptive information. Hardware components include high-speed interfaces to attached automated media duplication and packing equipment. A wireless transmission port is used to copy to customer wireless media.

The system architecture is composed of modular components. Each component may have more than one implementation (e.g., specific hardware or software or combinations thereof). This permits users of the system to choose an implementation that is appropriate to their circumstance. An implementation of a component design uses the best technology available at the time to fulfill the component design. Over time, improvements in technology will present better ways to implement a component design. Components may be reimplemented at any point in time using the latest technology.

The system has several architectural implementations. Under one embodiment, the Kiosks request content and services through system's published standard api. Content and service providers implement the api in order to provide content and services. The api is modular and object oriented therefore components can be separated and relocated to different locations.

Two important capabilities of the system architecture are a) the ability for discrete functional modules of the system to operate on widely distributed computers; and b) for the modules to be implemented in a variety of computer languages and platforms. Several embodiments utilize a Service Oriented Architecture (SOA) as the means to create these capabilities. The SOA accomplishes this by virtualizeing and making transparent the implementation or location of a particular software module.

SOA involves loose coupling of systems. The functionality of a component of the system is provided as a self-describing service. The service attributes are published and discoverable by consumers of the service. The description of the services is published in a Registry. Software applications interested in using the service can reference the service description to understand the mechanism of accessing the service. Web Services are a common means of implementing a SOA. Web Services Description Language (WSDL) defines interfaces and operation bindings which can then be implemented in any language or platform technology to provide the service. A Web Services Description Language (WSDL) defining one embodiment of software service operations is provided herein.

Several embodiments of the modular software design utilizes adapters and proxies to assist in virtualizeing and making transparent the implementation or location of a particular software module. A software adapter is used to convert messages from one architecture to another. The adapter converts the requests for content and services into a format understood by the content or service provider. Proxy software components are used to redirect a local request for a component to the appropriate component implementation, where the implementation resides on the local machine or remote machine The Adapter software module may reside on the kiosk or a remote service provider machine. The Content Adapter may issue a mount, map like I/O redirect to an iSCSI Network Attached storage appliance. Descriptive information entered into the Registry during registration provides sufficient information to create an adapter for a specific service provider or content storage device. To utilize an Adapter, the kiosk invokes a call to a proxy. The proxies are software modules that redirect the call for an adapter to the machine actually hosting the adapter.

This system may implement a SOA in one of 2 ways. Under the first SOA embodiment, a set of service descriptions are published by the System Manager. Each particular role is mandated to implement the services appropriate for their role. For example: Seller machines are mandated to implement the SendContent service, Administrator machines are mandated to implement the ProcessPayment service.

Under a second embodiment of a SOA architecture, there is no mandated or standard set of services. Each participant in the system publishes in the registry the services or content that it provides and a description of the services that the participating computer exposes to provide the advertised service or content. Each consumer of services and content consults the registry to determine how to access a specific published service Implementation of services may be virtualized through the use of adapters and proxies. The service provider computer may implement the service functionality in a proprietary api. An Adapter may be created to convert the underlying service functionality to the interface and binding specified by the service description. A proxy may be used to redirect the request to an implementation of the Adapter.

The administration server 115 performs a number of different functions. First, the administration server 115 maintains databases for participants in the system 100. The information concerning the participants includes lists of authorized participants, their type of authorization (e.g. buyers, sellers, both), and contact information. The administration server 115 also maintains a database of the content being offered by sellers and/or content sought by buyers. It should be noted that, in preferred embodiments, the database does not contain the content itself; rather, the information merely identifies the location of the content and the seller offering the content for sale. This information in the databases may be maintained using any method, including Relational Database Management Systems (RDBMS); Object Database Management Systems (ODBMS), ASCII files, and others. Although the information is maintained on one or more administration servers 115 in preferred embodiments, the information may also be distributed (located on individual participant computers).

In addition to maintaining the participant and content databases, the administration server 115 also provides system software to new participants. In preferred embodiments, a participant may download the system software over the communications medium 110. Once downloaded, the system software may be installed on a new seller computer 121-123 or kiosk 131-133. The administration server 115 may also employ load-balancing algorithms to ensure that the administration server 115 does not become a bottleneck in the flow of content between buyers and sellers.

Furthermore, the administration server 115 also brokers transactions to fulfill payment processing.

The administration server may provide specialized message brokering. Message brokering is a way to consummate transactions between applications of different data types. A message broker may provide message translation and/or message routing. Message translation is the conversion of a request into a format understood by the fulfiller of the request. Message routing is the application of business rules to determine the optimal location to fulfill a specific request.

Under one embodiment of Message Brokering, the native interfaces of computers offering content and services to each other may have a proprietary api. Administrative services from 3$^{rd}$ party service providers such as credit card processing, frequently present a fixed, proprietary api. A central message broker can provide a single access point which exposes a set of common standard services. Machines requiring content, information or services can send the request to the broker in a standard format. The message broker then applies any necessary adapter translation to convert the standard service request to the proprietary api of the service, content or information provider. The request is then routed to where the request can be serviced.

The administrative server may serve as an event server. Content sellers or other entities initiating events publish to the event server the type of events that they produce. New content of a certain genre or of a certain artist may be an event. Kiosks or other consumers of events subscribe to receive events of that type. When a published event occurs, content of that event is automatically sent to any computer subscribing to the event. Functionality of the Administrative Server may be delegated to specialized servers resulting in dedicated servers that perform: payment processing; registration; event processing; message brokering; and other functions. The Administrative server may fulfill some or all of the functions of the specialized servers. Specialized severs may be configured to fulfill some functionality of servers outside of their specialization. The functionality of the specialized administrative servers may be implemented on one or more computers in a kiosk LAN in order to provide a similar functionality to the kiosk.

Each software module used by the system generates a unique hash code. The unique hash code for each software module may be stored in the Registry or other central location. The administrative server, specialized server, kiosk other device executing or interacting with a software module from the system may authenticate that the software module is genuine by using the Software Module Authentication Service (SMAS). The SMAS will generate the hash code for the software module in question and verify that the hash code matches the hash code on file. The SMAS performs additional software module security checks using hash codes, path verification, monitoring of module external calls and other techniques well known to the art.

In preferred embodiments, the administration server 115 is a network consisting of a burstable TI internet connection, a zoned firewall, and redundant rackable server class web, mail and database servers running Java, Oracle IAS and Oracle 8i database.

Kiosks 131-133 are specially designed to locate, display and duplicate content. Each kiosk 131-133 implements several software components. An operations module provides a customer interface and content duplication functionality. A registry provides a repository of content and system descriptive information to be described in greater detail below. Each Kiosk 131-133 also preferably includes content duplication devices. Content duplication devices are typically, robot controlled, high speed media writers and media labelers. The media written to and labeled is typically optical media such as CD or DVD format media. Other optical media such as blue wave later technology is possible. Non optical media such as magnetic tape, paper or plastic is possible. Any media that can receive digital data and be written by a computer controlled writer is possible. The media written to may include electronic media that is wirelessly transmitted from the kiosk transmitter to the consumer electronic storage device. Kiosks 131-133 may also include a wireless transmitter port to copy to customer wireless media.

Each kiosk may contain one or more computers which may consist of any type of information processing or storage device. The kiosk computer is equipped with user data entry and output peripherals. The kiosk and peripherals are conformed into a high volume in-store, retail point-of-sale, customer kiosk configuration. The kiosk utilizes serverless, direct and network attached storage devices for the storage of content.

The kiosk has the data entry screens and functionality to enable the kiosk operating merchant to enter into contracts with sellers to act as reseller and intermediary of seller content. When the kiosk functions as such a seller intermediary and reseller, the merchant stores seller content on the kiosk. The kiosk then accepts connections from other kiosks to send seller content to authorized remote kiosks and retrieve seller content from authorized remote kiosks. In addition, content descriptor records are sent between kiosks to update the local kiosk content registry.

In some embodiments, kiosks 131-133 preferably include two modules: a Merchant module and a Buyer module. These modules may be implemented on a single computer or may be implemented on separate computers. When implemented on a single computer, the modules may simply comprise separate applets running in a Web browser.

The Merchant module provides proxyed Internet gateway access between the Buyer module and the Administration server 115. The Merchant module also decrypts content received from a seller computer and the handles the presentation of that content and/or the transfer of the content to a storage medium such as a writable CD-ROM. The Merchant module is also involved with payment transactions in some embodiments as will be described in further detail below. Additionally, the Merchant module maintains a content database locally in some embodiments for efficiency purposes. The Merchant module is preferably implemented on a personal computer with an Intel Pentium 500 Mhz processor mining Windows NT and a Java run time and preferably includes an Internet connection as well as a CD writer, a printer, a video capture card and a VCR. Preferably, a combination router/modem and packet filtering firewall such as the Netopia 7200 is configured to deny all connections except from the system administration 115, the Buyer module, and authorized sellers.

The Buyer module functions principally as a display device. It provides the monitor and a pointing device that allows the user to interact with the system. The Buyer module is preferably implemented on a diskless Unix appliance equipped with an Intel processor, at least 256 Mb memory, a bootable CD (which contains the Unix 08, device drivers and a browser), a monitor, and an Ethernet connection to the Merchant Module. The display device may be detachable.

Through the Buyer module resident browser, buyers can access a web page hosted by a server running on the Merchant module or on a central remote server. Functionality in the web page enables the customer to search a content database maintained at the remote server or, in some embodiments, a content database maintained locally by the Merchant module, for desired intellectual property. The web page enables the customer to input payment information (e.g., credit card numbers).

It should be understood that, although the kiosks 131-133 have been described above as comprising both Buyer and Merchant modules, it is possible for several Buyer modules to share a Merchant module. For example, in one contemplated implementation, a retail establishment may provide several Buyer modules located in a customer area of the store. Each of these Buyer modules may be networked to a single Merchant module located in a protected area of the store such as behind a counter. In such an embodiment, retail customers search for desired content at the Buyer module. A payment transaction is then initiated. The different methods for initiating the payment transaction are discussed in greater detail below. Once payment is completed, the content may be received at the Merchant module and transferred to a storage media. The customer then proceeds from the Buyer module to the counter, where store personnel hand the media to the customer.

a Multi User embodiment of the Customer Kiosk utilizes a single computer supporting multiple local users. The kiosk computer supports multiple simultaneous connections of keyboards, terminals and other user interfaces and provides each user with a separate view of the system. The kiosk computer is custom fitted with ports for multiple keyboards and monitors. The computer operating system utilizes an operating system that is recompiled and configured with kernel module extensions to support multiple monitors. With the extended operating system and daisy chained disk drives, the Multi User version supports multiple customers without the complexity of multiple computers.

There are several Local Area Network (LAN) kiosk embodiments. Under the first LAN embodiment, the Kiosk employs individual customer view station computers connected via a Local Area Network. Storage is directly attached to each customer view station or directly connected to the LAN. Likewise, the automated media duplication and printing equipment can be attached to any of the computers. Individual computers collaborate as peers. Downloaded and cached content is shared among all peer computers. Each peer computer can perform any task. Duplication and printing equipment can be moved to any computer. Under this configuration there is no central server or single point of failure.

Under a second LAN embodiment of the Customer kiosk individual customer view station computers are connected to a LAN. The automated media duplication and production equipment is directly attached to one or more LAN connected production servers. Mass storage of content is provided without dedicated storage servers by using Networked Attached Storage (NAS) appliances as a repository of content. The NAS may be on the local LAN or hosted at a remote site accessible through the WAN. A registry is maintained on one or more registry server computers. The registry servers store no content but rather contains a database of content description and location information indicating content that is available from local and remote devices. The registry server communicates with local and remote devices to send and receive registry content descriptor records which are used to update the local registry and remote registry databases. The registry server computer communicates with local and remote devices to send and receive content and update the kiosk repository of content. The registry server computer provides a content retrieval service to the display computer where the retrieval service will find and retrieve requested content from the nearest appropriate local or remote content source device.

Variations of the LAN embodiments require differing segmentation of the LAN. Under one variation the display computers, the production server computers and the Registry Server computes are on one kiosk LAN. A second kiosk LAN consists of the Registry Server and Network Attached Storage devices. Outside WAN access is accomplished through the Registry server. Under another variation of the LAN embodiment, only the display computers are connected to the external WAN.

An embodiment of the LAN configuration is specially configured for table top deployment such as in a coffee shop. In the table top configuration the display computer is a flat tablet computer. Networked to the tablet computer may be a production computer with attached receipt printer; media writer; media package and label printer; credit card reader; cash and coin receiver.

In the remote web controlled embodiment of the Customer Kiosk, customer search and display functionality is delivered through web page screens delivered from a remote server. Under this configuration all software functionality is supplied through a web page. Customers access the web page to accomplish their search, selection and view functionality. The web page screens have an embedded object that provides the captures web page events and communicates directly with a listener software module on the display computer operating system. An event listener software modules on the display computer responds to customer entered web page event. The listener forwards the captured Web page events to other appropriate machines for a response to the web page event.

In other embodiments, unattended kiosks, which may be located in public areas such as shopping malls, include both a Buyer and Merchant Module. In such embodiments, both modules may be contained in a single physical kiosk.

Alternatively, the kiosks 131-133 may be implemented on a home computer using a home configuration. The software for the home computer may be downloaded from the administration server 115 or may be obtained by other means.

The Seller computers 121-123 may be any computer that can store content for sale and that can communicate over the communications medium 110 with the administration server 115 and the kiosks 131-133.

Figure 2:
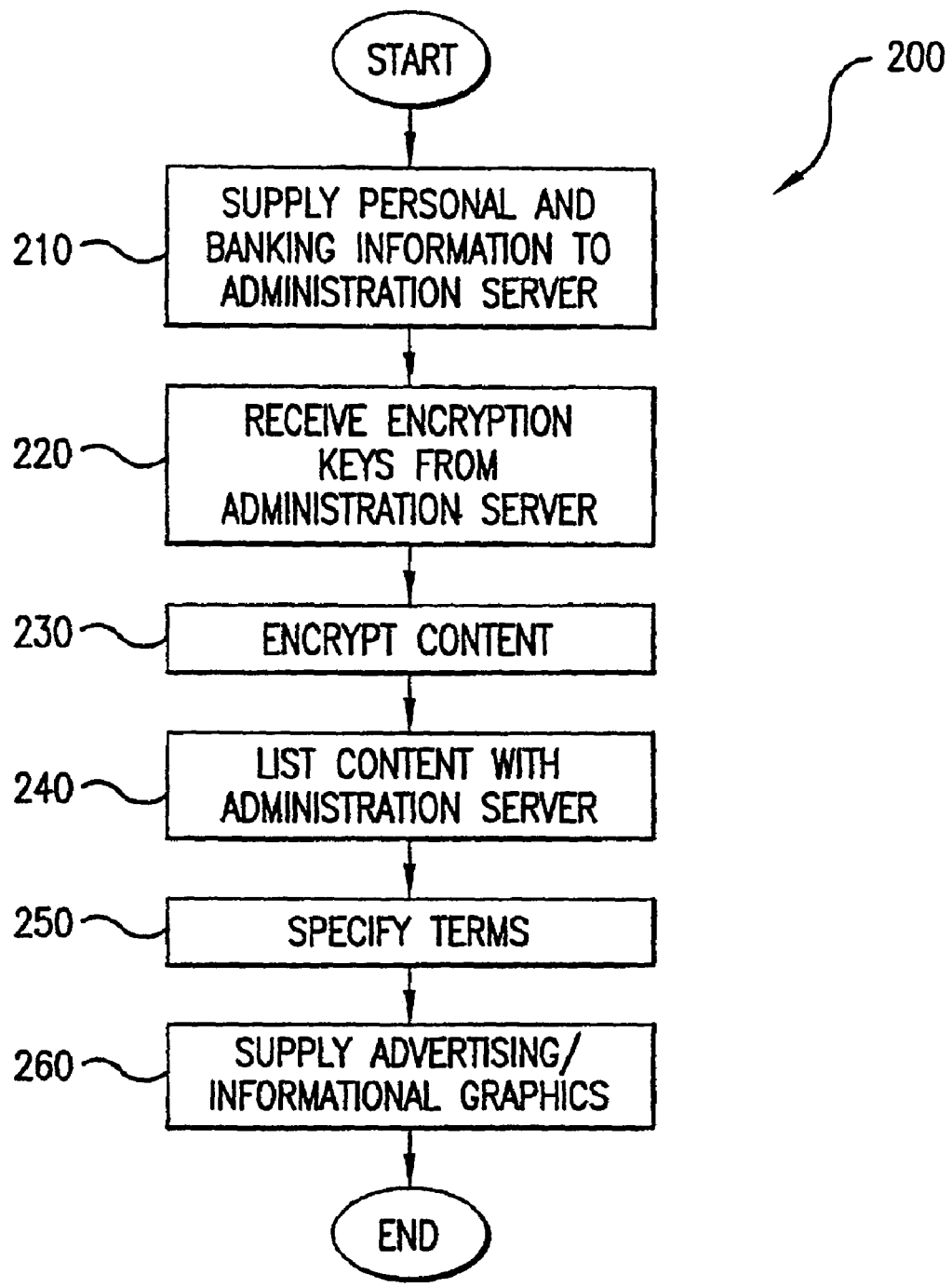
FIG. 2 is a flowchart illustrating the seller registration process according to a first preferred embodiment of the present invention.

The first step for a seller wishing to sell content on the system 100 is for the seller to register with the administration server 115. Referring now to FIG. 2, the first step 210 in the seller registration process 200 consists of supplying sufficient personal and banking information to securely conduct business with the other participants in the system 100. Personal encryption and authentication keys, which are generated by the administration server 115 during registration in preferred embodiments, are received by the seller at step 220. Methods for processing payment transactions over the Internet using such keys are well known in the art and will not be discussed in further detail herein.

A descriptor record describing the seller and content registered is created and entered into the Registry database. The Registry then propagates the descriptor records to any remote Registries Under alternative embodiments, Registration services are potentially offered from a number of sources including dedicated Registry servers and Group kiosks with administrative capabilities.

Next, the content to be sold on the system 100 is encoded and encrypted at the seller's computer using the keys obtained from the administration server 115 at step 230. At step 240, the content is listed with the administration server 115. (In embodiments in which content databases are stored locally at kiosks 131-133, the local databases are updated by the Administration server 115). The seller provides information such as the title or other description of the intellectual property. This information will be used to allow potential buyers to locate the content. In addition, the terms under which the content is offered are also specified at step 250. In preferred embodiments, the administration server 115 provides several exemplary license and/or sales agreements from which a seller may elect to offer the content. The seller preferably is also allowed to supply their own terms under which the content is to be offered rather than selecting from one of the exemplary licenses or sales agreements.

Content to be sold may include tickets to events. The seller may supply informational and/or advertising graphics at step 260. If the seller represents an event producer or a venue selling tickets, the seller will provide a graphical depiction of a map of the venue and assign seat numbers and ticket prices for presentation at a kiosk 131-133. The seller may also supply advertising clips for display at kiosks 131-133 during periods when the kiosks 131-133 are not being used for a sales transaction.

Figure 3:
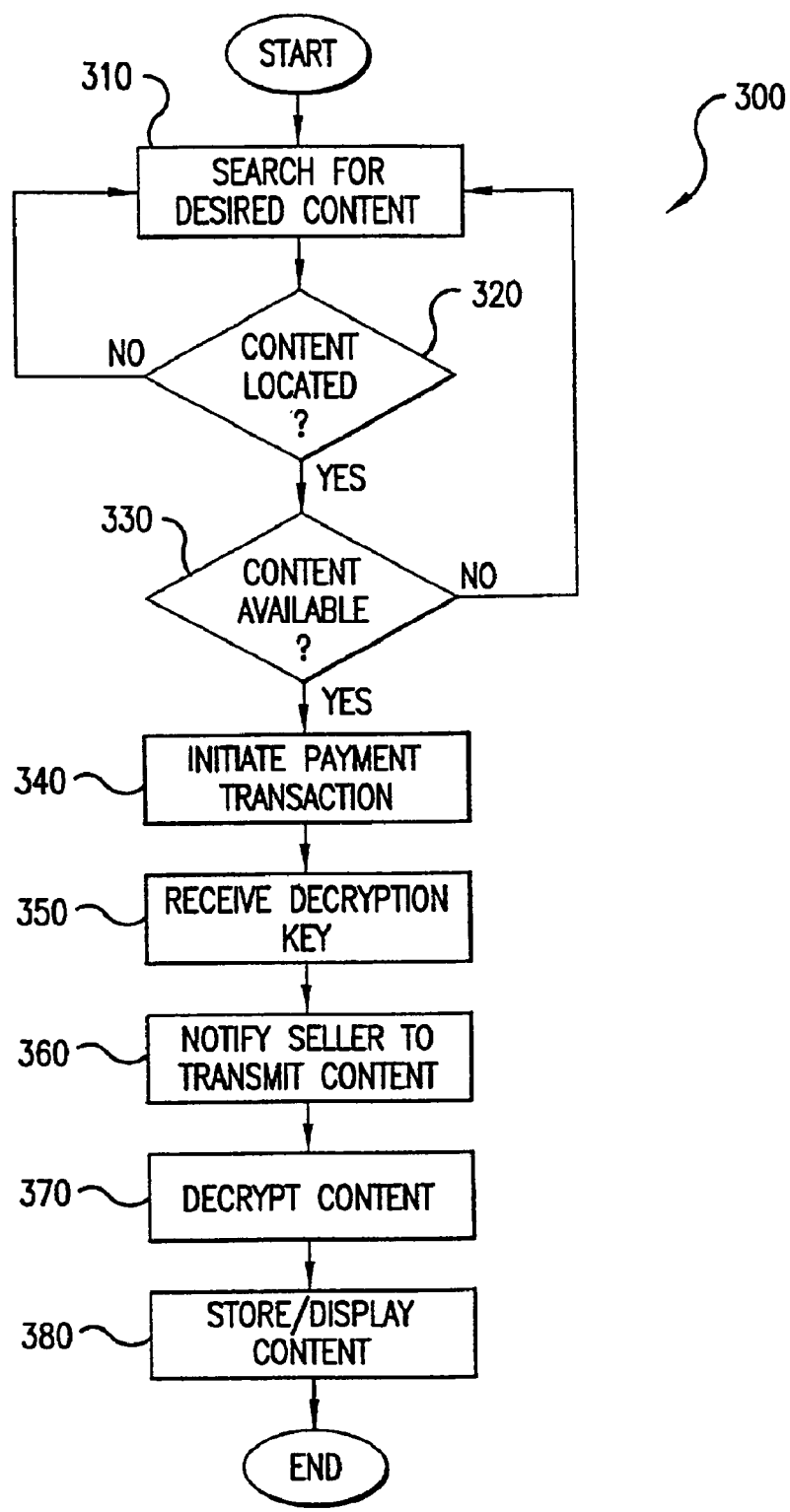
FIG. 3 is a flowchart illustrating the purchasing process according to a first preferred embodiment of the present invention.

Once the seller has completed the registration process 200, content is available to potential purchasers. The purchasing process 300 will now be described with reference to FIG. 3. A purchaser begins the process by using the resident web browser of a Buyer module of a kiosk 131-133 to search for desired content at step 310. Agent technology may be employed in the search for desired content. If the content is not located at step 320, step 310 is repeated. Once the content has been located at step 320, the Administration server 115 determines whether the content is available at step 330. This step is necessary because the content is not stored centrally and it is possible that a seller's computer may not be accessible at any given time. If the content is not available, the purchaser continues searching at step 310. If content is available, a payment transaction is initiated at step 340.

Under alternative embodiments, the local Registry database contains a listing of available content, where the content is located and what access api or adapters are required. The Registry continually receives real time update of descriptor records describing the status of content source machines. When a content source machine comes on line, a descriptor record is propagated to all registries, informing kiosks of the machines availability. Failed connection attempts to a content source machine likewise causes a status descriptor record to be propagated throughout the network of participating machines. Under this scenario, the customer is displayed only content that is available.

Content may be located and retrieved from a variety of content source machines, web sites and information storage facilities. Content sources are provided by a variety of individual and corporate entities. The relationships between the content sources and kiosk owners is equally varied and dynamic. The system provides the capability of adding, dropping and changing content sources and kiosks in real time.

There may be duplicate copies of a file of content. Content may be cached in the serverless Network Attached Storage appliances on the kiosk local LAN or at a location on the WAN. Content may be located on a seller machine. Content may be located on the machine of an entertainment company or entertainment content distributor. Content may be located on other kiosks.

Upon initiation of the payment transaction, the Buyer module displays the terms under which the content is being offered to the purchaser. The purchaser must accept these terms for the payment transaction to continue.

Payment transactions may be accomplished in a number of ways. In some embodiments, the customer simply enters a credit card number (either by swiping it through a card reader or using a keypad to enter the digits) at the Buyer module. The Buyer module then transmits the credit card number to the Merchant Module, which in turn transmits it to the Administration server 115 which is operated by the System Manager. The administration server 115 brokers the debiting of an account associated with the credit card with a financial institution and the corresponding crediting of the seller's account. In one business model, there is a "spread" between these amounts that is retained by the Administrator server 115. Some of this spread represents profit to the operator of the Administrator server 115. Some of the spread may be shared with the owner of the kiosks 131-133 as compensation for providing and maintaining the kiosks 131-133. This method is particularly well suited to unattended kiosks, but may be used in a retail establishment as well.

In another method of effecting the payment transaction, which is particularly applicable to a retail store environment with several Buyer modules networked to a single Merchant module as described above, the user of the Buyer module simply selects the desired content. The Merchant module passes the request along to the Administration server 115, which then automatically debits the account of the owner of the Merchant module. In this business model, the owner of the Merchant module has previously agreed to be invoiced by the Administration server 115 on some periodic basis (e.g., monthly). The Administration server 115 then credits the account of seller.

Unlike the credit card transaction described above, in this business model, no actual transfer of funds occurs before content delivery. Rather, the Administration server maintains an internal accounting of transactions and funds are transferred when invoices are issued. The seller then sends the content to the Merchant module, which readies it for display or stores it on a storage medium. The user of the Buyer module (the ultimate customer) then pays the kiosk operator or the retail establishment merchant, at which point the medium is handed to the customer and/or the display of the content is commenced. This method has the advantage of being able to handle cash transactions rather than requiring the use of a credit card. This method could, of course, also be used with unattended kiosks provided that a means for accepting cash payments (such as coin slots and other payment devices associated with common vending machines) are provided.

Numerous other schemes for effecting payment transactions are also possible. These schemes, which are well known in the art and will not be discussed in further detail herein, should be understood to be encompassed by the present invention. As used herein, the term "broker" should be understood to encompass any means by which funds are ultimately transferred from a purchaser of intellectual property to the seller of the intellectual property.

Payment processing must frequently address the micropayment problem which occurs for purchases of small dollar amounts. The micropayment problem is that the cost of $3^{rd}$ party processing for a credit card, electronic or other type of payment may exceed the revenue of the purchase One embodiment for addressing the micropayment problem applies if the customer makes multiple purchases within a short time frame and each purchase falls below a certain minimum amount. Each of micropayments for the particular customer are held in a batch and submitted to the electronic payment processor as one payment An alternative micropayment embodiment is that the micropayments are held in a batch for a period of time until the number of payments in the batch and the total value of payments in the batch reach the batch release size, where the batch release size is a function of the cost of the payees chosen method of receiving payment. When the batch release size is reached, all payments to the payee are bundled as one transaction and submitted to the electronic payment processor, where said submission may be through any payment processing means.

An alternative micropayment embodiment is the System Manager first requires sellers and merchants to open an account at a bank designated by the System Manager where the System Manager has a disbursement account. The System Manager disburses funds to seller and merchant account from the disbursement account through bank electronic billing.

Still another micropayment model is for the System Manager to hold authorization of customer electronic payment. The System Manager then submits to the payment processor authorizations held for a period of time. The $3^{rd}$ party payment processor bundles all authorizations for a single customer into a single transaction. The payment processor charges clearing fee divided by all authorization submitters.

Once the payment transaction has been completed at step 340, the Merchant module then receives the key needed to decrypt the seller's content from the Administration server at step 350. Next, the Administration server notifies the seller to transmit the encrypted content to the Merchant module at step 360. The received content is decrypted by the Merchant module at step 370. The Merchant module 370 then stores the content on a medium or displays it to the user via the Buyer module at step 380 to complete the sale. Any money due from the purchaser is collected at this time.

Under alternative embodiments, the decryption keys may be stored in various locations. The Seller may store the decryption keys on his content server or on his dedicated key server. The keys may be stored by a specialized key storage entity. The keys may be stored on a centralized system key storage machine.

In some embodiments, a cache capability is provided, preferably under the control of the seller. Intellectual property that is frequently sold over the system 100 may be stored locally at a kiosk (if agreed to by the seller) in order to avoid requiring repeated downloads. One situation where caching might be particularly valuable is when a kiosk is in a location such as a record store and a new work is released by a popular recording artist. In this situation, multiple copies of the new work may be sold in a short period of time. By caching the work at the kiosk, the time delays associated with repeated downloads are avoided.

Figure 4:
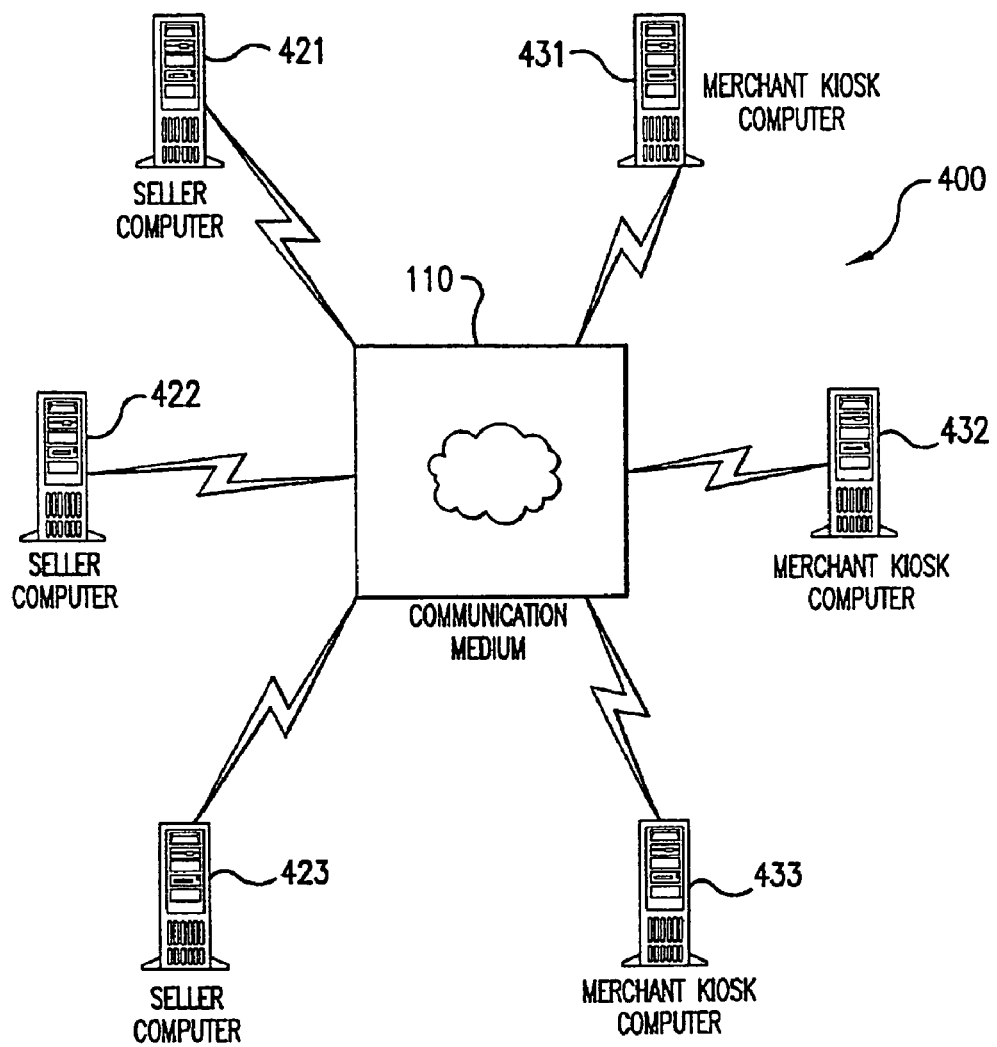
FIG. 4 is a block diagram of a brokerage network according to a second preferred embodiment of the present invention.

In the first preferred embodiment discussed above, the administration server 115 participates in the brokerage of transactions. In a second preferred embodiment, the administration server 115 does not participate in the brokerage of transactions. The system architecture of this embodiment is a server-less, peer-to-peer network 400 as shown in FIG. 4. In the system 400, a plurality of seller computers 421-423 are connected to a plurality of kiosks 431-433 through communication medium 110, similar to the first embodiment described above. In this embodiment, as in system 100 described above, content is transmitted directly from a seller 421-423 to a kiosk 431-433.

In the system 400, potential sellers and merchants gather information, e.g., by visiting a website (not shown in FIG. 4), describing the computer requirements for participating in the system 400. Once the appropriate computer is obtained, software may be downloaded from the website or otherwise installed on the computer. The software includes utilities, a public encryption key, and a list of registered kiosks.

Once the computer has been appropriately configured with the software, participants register through any computer offering registration services. In accordance with various aspects of the invention, kiosks, representative kiosks, registration server or administrative servers may offer registration services. Participants enter their content and system descriptive information and the registration service provider machine creates a descriptor record containing information describing the registering computer and its contents.

The descriptor records are preferably propagated to kiosks 431-433 through a variety of methods. Each kiosk 431-433 preferably maintains a registry of participating computers and of content that is available system wide. The kiosk registries are updated by descriptor records.

Figure 5:
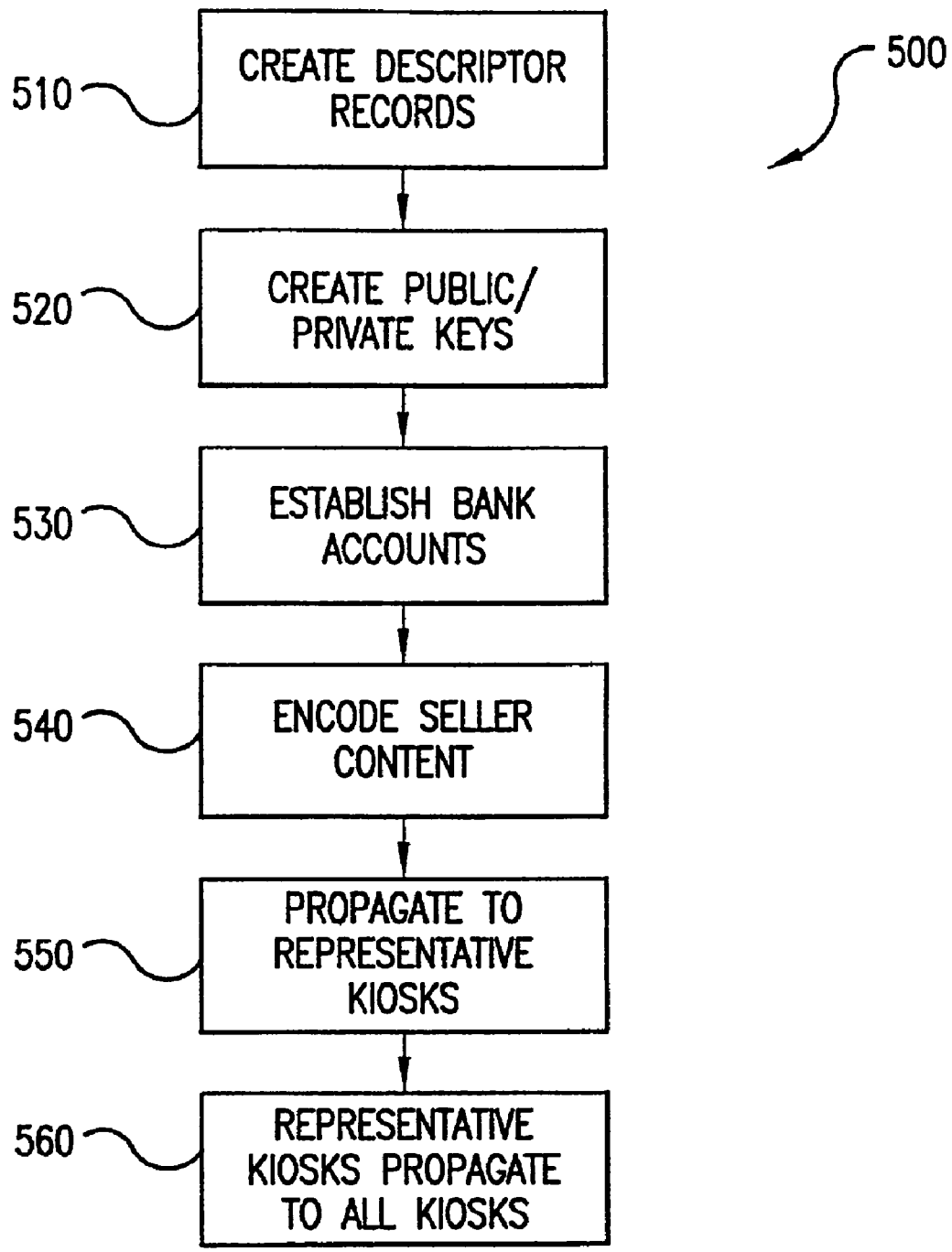
FIG. 5 is a flowchart illustrating the seller registration process according to a second preferred embodiment of the present invention.

In accordance with a specific implementation of the invention, a seller begins the registration process 500 illustrated in FIG. 5. Registration is the process of creating descriptor records containing identifying information about a seller, seller content, merchant or other data and adding it to the registration database. In some embodiments, descriptor records may include information describing the api of any content access or administrative services that the registering computer may offer. Descriptive information of the access api is used to generate a WSDL definition of the access api. The registration process may also automatically generate an adapter from the WSDL. An adapter may be used by other machines requesting content to translate their request into the api of the content machine.

The registration database maintains sufficient information for users of the system to locate content and each other. The complete registration database is preferably present on each kiosk computer 431-433. The registration database is kept current through a process of propagation described below. Each new seller machine 421-423 has a list of kiosks to contact to being propagating the seller content information to all other kiosks 531-533 in the system 400.

In preferred embodiments, the registration database is composed of a number of keyed, indexed, random accessed ASCII files. The database is read only during hours of operation, improving performance of searches. New descriptor records propagated to a kiosk 431-433 are held in queue and then added to the registration database at that kiosk during a nightly batch database rebuild process. The database rebuild adds new records and rebuilds the keys and indexes. Multiple high performance disk drives, specialized search algorithms, and optional compression and deletion of unused descriptor records enable the registration database to grow to significant size.

At the start of the registration process 500, descriptor records are created for each intellectual property seller at step 510, which is performed with the aid of the downloaded software. The descriptor records include personal information, financial information, and information about the seller's computer.

Next; at step 220, a public/private key pair are generated. The public key is included in a descriptor record. The private key is securely stored on the computer. At step 230, the merchant (the operator of the kiosks 531-533) and the seller establish accounts with a financial institution service provider. In preferred embodiments, bank account and credit card transactions are outsourced to a financial institution. Accounts provided by the financial service provider are accessible to computers in the system 400.

Each unit of content being offered for sale is encoded at the seller's computer 421-423 at step 540. Each unit of content is preferably stored on the seller's computer in a standard encoded format. To encode a unit of content, the seller uses one of the utilities included with the downloaded software.

The system does not invent any new encoding or encryption software. The included encoding and encrypting utilities may be commercial off the shelf (COTS) applications included with the system software for convenience. The compatible encoding and encrypting software may be obtained separately from other sources.

Sellers may select from among several commercial off the shelf (COTS) applications to encode their content. Examples of COTS encoding applications are Apple QuickTime® and Microsoft Windows Audio/Video. In addition to encoding, sellers may use COTS applications to create a read-only decryption key and a write decryption key. A read-only key permits content to be displayed and viewed but not copied. A write key permits content to be played, viewed and written to media for distribution.

The seller enters descriptive and labeling information about the content. The seller may include sample clips for advertising purposes. If the seller is an event producer or venue selling tickets, a map of the venue may be included. The content is encrypted using the private key obtained at step 520. The content is then compressed and stored on the seller's computer.

Content decryption keys may be stored in a repository called the key store. Other keys in the key store may be digital certificates or private keys used for access, authentication and authorization. The authorization and authentication keys are preferably generated during registration. The key store may be co-located with content, or stored remotely. The key store may be managed by the seller machine. Alternatively, the key store may be managed by a key store management service which may be a part of administrative services.

After encoding the seller content, it is desirable to make the seller content available for purchase. There are several ways to make seller content available. For example, the seller may store his content at a designated location (kiosk or computer). In the process of generating the content registration or updating the content registration, the location of the content is recorded. Registry records may then be propagated throughout the system informing other kiosks 431-433 of the content availability and location.

In accordance with another technique for making seller content available to kiosks 431-433, a merchant operating a kiosk 431-433 may enter into an agreement with one or more sellers where the merchant acts as an agent for the seller or an intermediate reseller. The merchant then stores content on the kiosk and makes the content available for sale. The merchant may make content stored on a first kiosk available for sale and download to a second kiosk.

In accordance with still another technique for making seller content available to kiosks 431-433, the seller can store content on its own system or the system of a service provider. Kiosks 431-433 may then copy content from a seller machine 421-423.

The encoding process also creates a descriptor record for each unit of content, which is then ready for propagation to the kiosks 431-433. The descriptor records are propagated to representative kiosks at step 550. Additional representatives from a group are contacted if the first representative does not acknowledge receipt. To aid in propagation, kiosks are divided into geographic groups consisting of thousands of kiosks per group. Each kiosk maintains the complete list of all the kiosks in its group as well as a list of several representative kiosks from every other group. A representative is any kiosk which has agreed to assist with the administration of the system 400. Representative kiosks assist with propagation traffic and make available the system software for download to other computers. Payment processing programs recognize representative kiosks and pay the representative kiosks an administration fee. Any kiosk can be a representative kiosk. There is no limit to the number of groups or the number of representative kiosks in a group. Representative kiosks are normally those kiosks with a history of high volume and consistent up time. Representative kiosks run regular performance monitoring programs to measure performance and availability of all other representative kiosks. Once the seller has propagated the descriptor records to the representative kiosks, the representative kiosks propagate the descriptor records to all other kiosks at step 560.

In preferred embodiments, the System Manager may divide existing groups or start new groups. Kiosks become representatives kiosks by applying to the system administrator and receiving a representative kiosk designation. Upon designation of a kiosk as a representative, the System Manager propagates a descriptor record informing the system 400 of the new representative kiosk. Representative kiosks can become decertified if the uptime and other quality factors fall below a predetermined level.

An alternative design employs traffic analysis software to determine if an existing group needs to be divided. Periodically, the group's top performing kiosk will run the traffic analysis routine. If the group has grown beyond a threshold point, results from the performance-monitoring program will be used to select the new representative kiosks. The selected representatives are e-mailed an acceptance form to consent to selection. Descriptor records will be generated announcing new groups and representatives.

Propagation can alternatively be implemented using mbone or ip multicast. An optional architectural alternative to maintaining local kiosk databases through propagation is to use one or more central servers to process and store descriptor records. In this alternative, descriptor records would be implemented as relational database tables or other objects inherent in the chosen database management system.

It should be understood that seller machines 421-423, instead of or in combination with the kiosks 431-433, could store and propagate the descriptor database.

An embodiment for the propagation of descriptor records where first the content source computer updates content or the source machine attributes. Next the content source computer creates descriptor records describing update. Finally the content source machine sends descriptor records to all kiosks.

An embodiment for the propagation of descriptor records where first the content source computer updates content or the source machine attributes. Next the content source computer creates descriptor records describing update. Next the content source machine sends descriptor records to nearest representative kiosk. Next the representative kiosk sends descriptor records to all other representative kiosks. Finally the 2<sup>nd</sup> representative kiosk sends descriptor records to all other kiosks.

An embodiment for the propagation of descriptor records where first each kiosk is assigned a propagation branch where the branch is a subnet of the internet and each kiosk is assigned an order number within the branch where the order number is a function of the IP address of the kiosk in comparison with other kiosks in the branch and the lowest order number kiosk in a branch is the propagation branch root kiosk. Next, the content source computer updates content or source machine attributes. Next, the content source computer creates descriptor records describing updates. Next, the content source machine sends descriptor records to the propagation branch root kiosks. Next, the kiosk receives descriptor records and sends record received message back to sending computer. Next, the kiosk receiving the descriptor record updates the content registry with the descriptor records. The kiosk then sends descriptor records to the next ordered numbered kiosk in the propagation path. If the sending kiosk does not receive a record received message, the sending kiosk will create a system unavailable descriptor record and send the system unavailable descriptor record to the propagation branch root kiosk for propagation through the system. When a kiosk comes on-line, the kiosk will create a system available descriptor record and send the descriptor record to the propagation branch root kiosks. The process repeats until the high order number kiosk in all paths receive the descriptor record.

An embodiment for the propagation of descriptor records where first the descriptor receiving computer subscribes with event notification service to receive descriptor records with specified attributes of interest. Next, the content source computer updates content or source machine attributes. Then the content source computer creates descriptor records describing update. Next, the content source machine sends descriptor records to the event notification service. Finally, the event notification service sends descriptor records to subscribing descriptor receiving computers.

An embodiment for retrieving content where first the content receiving computer subscribes with event notification service to receive content with specified attributes of interest. The content source computer updates content on content source machine. Next the content source computer creates descriptor records describing content update. The content source machine then sends content source update descriptor records to event notification service. The event notification service connects to content source computer and retrieves content of interest. Finally, the event notification service sends content to all computers that subscribed to content of interest An embodiment of retrieving content in a key pair peer-to-peer connection method where first a connection requestor computer encrypts an access authorization message using the requestor computer private key. Next, the connection requestor computer presents the encrypted message to the connection receiver computer. Then the receiver computer will lookup the public key of the requestor computer in the authorized key store. Next, the receiver computer authenticates the requestor computer by decrypting the message using the public key. Afterwards, the receiver computer will access the revoked key store on the receiver computer and verify that requestor computer access authorization has not been revoked. Finally the requestor and receiver computers exchange data.

An embodiment of retrieving content in an administrator supplied key pair method where first on a periodic basis, the administrative server will generate a new access authorization public-private key pair. Also on a periodic basis, each kiosk computer will connect to the administrative server computer and receive the access authorization private key. The kiosk computer will store the key in memory only. Additionally, on a periodic basis, each seller computer will connect to the administrative server and receive a digital certificate containing the access authorization public key. To begin retrieving content, the connection requestor computer encrypts an access authorization message using the access authorization private key. Next the connection requestor computer presents the encrypted message to the connection receiver computer. Afterwards, the receiver computer authenticates the requestor computer by decrypting the message using the public key. Next the receiver computer will access the revoked key store on the receiver computer and verify that requestor computer access authorization has not been revoked. Finally, the requestor and receiver computers exchange data.

An embodiment of retrieving content in an administrator supplied private key method where first on a periodic basis, the administrative server will generate a new connection authorization private key. Also on a periodic basis each computer will connect to the administrative server and receive the connection authorization private key and store the private key in memory only. To retrieve content, the connection requestor computer encrypts an access authorization message using the access authorization private key. Next, the connection requestor computer presents the encrypted message to the connection receiver computer. Afterwards, the receiver computer authenticates the requestor computer by decrypting the message using the private key stored in memory of the receiver computer. Next the receiver computer will access the revoked key store on the receiver computer and verify that requestor computer access authorization has not been revoked. Finally the requestor and receiver computers exchange data.

Figure 6:
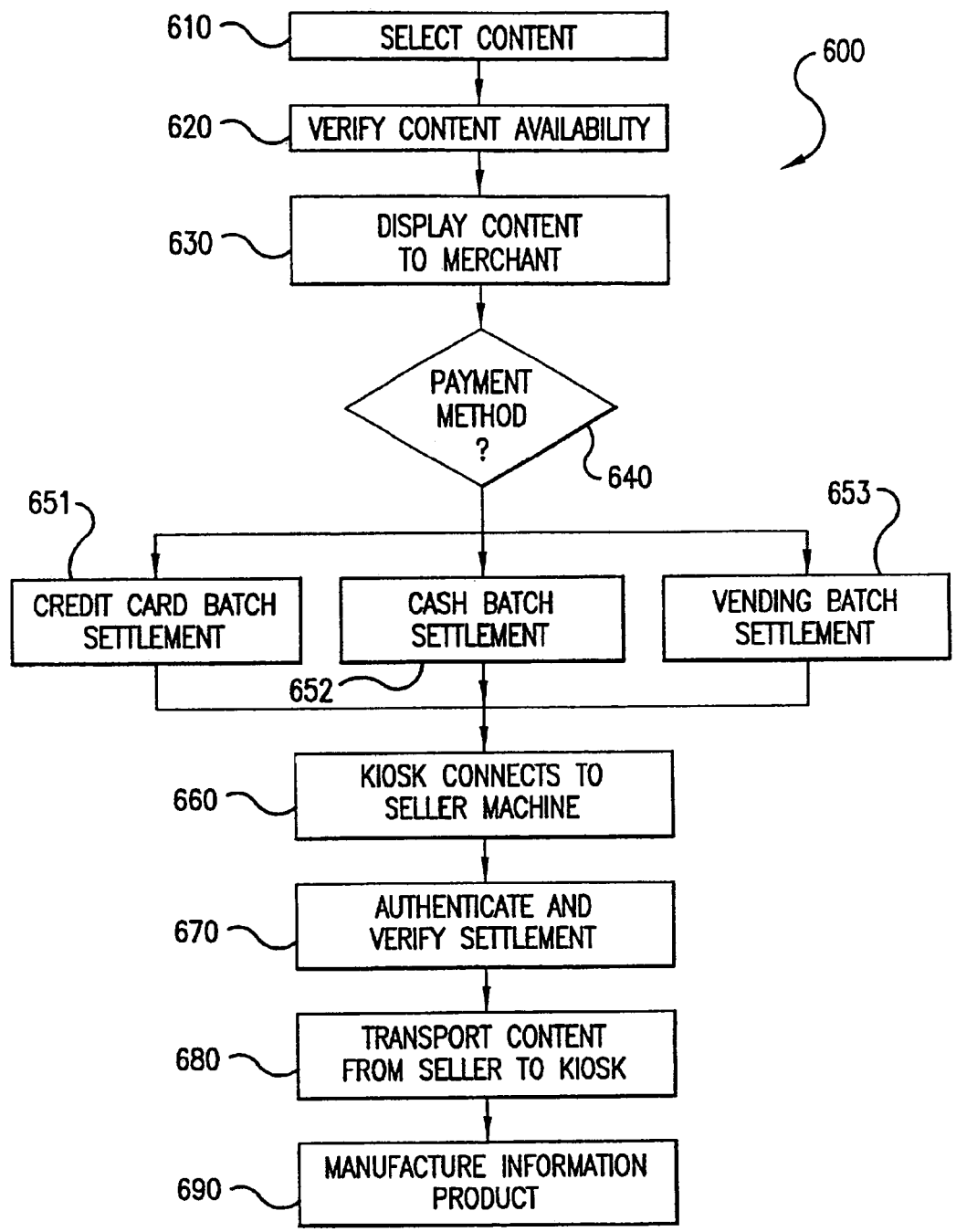
FIG. 6 is a flowchart illustrating the purchasing process according to a second preferred embodiment of the present invention.

An embodiment for retrieving where first the content requesting computer encrypts a content request message using the requesting computer private key. Next the requesting computer connects to an administrative computer where the administrative computer is any computer providing administrative services. Afterwards, the administrative computer looks up the public key of the content requesting computer in the authorized computer keystore. Next the administrative computer authenticates the content requesting computer by decrypting the content request message using the content requesting computer public key located in the certificate. Then the administrative computer will look up the content requesting computer in the revoked key store and verify that the content requestor computer access authorization has not been revoked. Next the administrative computer uses the content requesting computer content request message to create a new content request message. Then the administrative computer encrypts the content request message using the administrative computer private key. The administrative computer then connects to the content source computer and presents the encrypted content request message. Next, the content source computer authenticates the administrative computer by decrypting the content request message using the administrative computer public key located in the certificate. Afterwards, the content source computer will look up the administrative computer in the revoked key store and verify that the administrative computer access authorization has not been revoked. Next, the administrative computer retrieves content from the content source computer. Finally the content requesting computer receives content from the administrative computer An embodiment of retrieving content where first the content requesting computer examines the registry to determine the location of content with specified attributes. Then the content requesting computer notifies registry of desire to receive content with specified attributes as such content becomes available. Next the registry monitors registry descriptor records for availability of content with specified attributes. The registry initiates retrieval of content with specified attributes when said content becomes available. Finally the content requesting computer receives content from the administrative computer After registration is complete, content is available for purchase. The purchasing process 600 will be described with reference to FIG. 6. A buyer begins the purchasing process 600 by using the kiosk buyer module. The buyer searches for and selects desired content at step 610. A buyer may register and configure an agent to search for content while the buyer waits, or to contact the buyer in the future when content becomes available that meets the buyer's criteria. In keeping with an aspect of the invention, in response to a buyer command, a kiosk 431-433 searches its local registry and returns a list of content and content sources matching the search criteria. The buyer may then select from the list of content. Once content is selected, the kiosk verifies that the content is available at step 620. If the content is unavailable, a descriptor record noting the unavailability will be propagated to kiosks in the system 400.

If the content is available, a more detailed description of the content and the terms of sale are presented to the buyer at step 630. If the buyer accepts the terms, the payment transaction begins with the buyer being queried, at step 640, as to which mode of payment is desired. If the buyer indicates a credit card transaction, then the kiosk connects to the financial service provider, which executes a credit card batch settlement program at step 651. Batch settlement of electronic buyer payment consists of debiting the buyer account, then crediting the seller, merchant and the System Manager account the appropriate amounts (e.g, seller gets purchase price less a commission of X %, which is shared between the merchant and the system administrator).

If the buyer pays the merchant cash, the financial service provider cash batch settlement program 652 is executed. The purchase amount, less the merchant fee, is deducted from the merchant bank account. The seller and System Manager accounts are then credited with the appropriate amounts.

If the buyer pays cash through coin slots or other means at a kiosk (such as an unattended kiosk), the kiosk executes the financial service provider vending batch settlement program at step 653. The price less a fee is debited from the merchant's account and the System Manager and seller's account are credited the appropriate amounts.

Each of the financial service provider batch settlement programs return a record which contains an unencrypted error code indicating the success or failure of the settlement program. The return record also contains information encrypted with the private key of the financial service provider. The encrypted information in the return record includes the public key of the purchasing kiosk, the seller's content file number, and the amount paid.

In the above description, the kiosk initiates the transaction in that the kiosk sends a message to the financial service provider. It will readily be appreciated that the message to the financial service provider could be sent from the seller machine rather than from the kiosks. In such embodiments, a message from the kiosk to the seller machine authorizing the transaction may be necessary, such as in an embodiment in which the kiosk is configured to accept cash from the buyer.

If the settlement was successful, transmission of content begins. The kiosk connects to the seller at step 660 and presents the encrypted financial service provider return record. The seller machine retrieves the public key from the financial service provider and decrypts the return record. The decrypted return record is used to authenticate the connection and verify the settlement at step 670. The seller then permits the merchant module to copy the content along with the necessary decryption keys at step 680. After the content has been transported, it is made available to the purchaser, either by copying it onto a storage medium or presenting it on a display device on a one time basis, at step 690. As above, numerous alternative payment options exist. In still another embodiment, the invention may be implemented in a flexible, multi tier, web service based architecture.

Although the above descriptions discuss the distribution of intellectual property in a buyer-initiated context, it should be understood that the invention is equally applicable to a seller-initiated context. That is, the invention may accept from a buyer an identification of intellectual property desired to be purchased along with desired terms. Prospective sellers may search the list of desired intellectual property and elect to sell the desired intellectual property to the buyer, with the transaction being brokered by the Administration server 115. As above, agent technology may be used to match buyers with sellers in this context.

Figure 7:
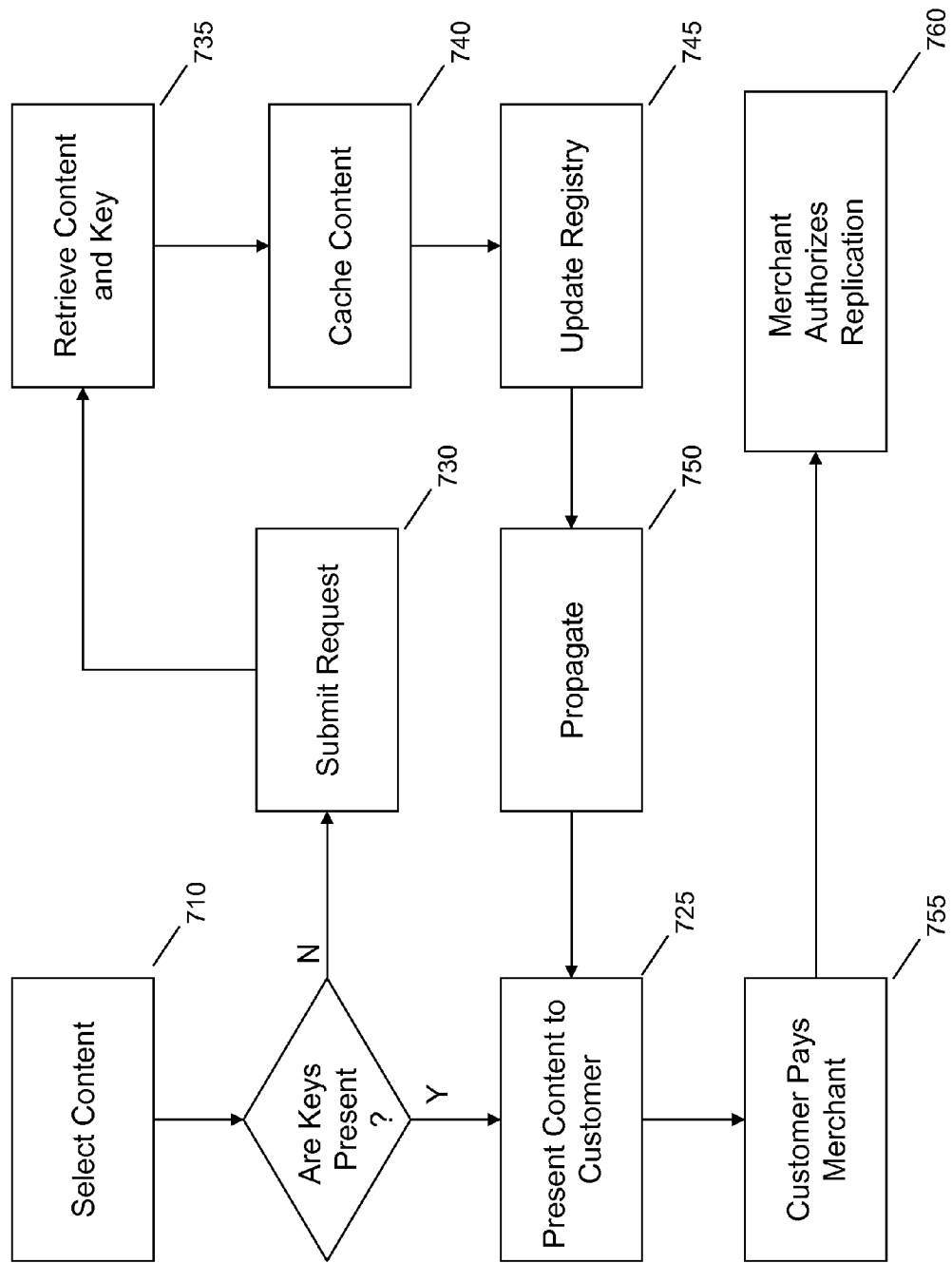
FIG. 7 is a flowchart showing the purchasing process according to still another embodiment of the invention.

An alternative purchase process is depicted in FIG. 7. Using the kiosk buyer module, the buyer searches for and selects desired content at step 710. Kiosk 431-433 search the local registry then a return a list of content and content sources matching the search criteria. In embodiments where kiosks 431-433 include a "selected content" and/or "content read" keys, the buyer may simply depress the keys and the kiosk presents content to the buyer in read only format, step 725. In embodiments where kiosks 431-433 do not contain either the selected content" or the "content read" buttons, kiosk 431-433 submits a request to retrieve content or a decryption key from the computer that that has the content or key in step 730.

Depending upon the system configuration and architecture, there are a variety of methods for the source computer to service the kiosk request for content or content decryption keys. Under one configuration, kiosk 431-433 may connect directly with a source machine. Alternatively, the kiosk may connect to an intermediate representative kiosk or administrative server. The intermediate machine then connects to the source machine on behalf of the requesting kiosk. Under a second system configuration such as a Service Oriented Architecture, the kiosk may also connect directly to the source machine or indirectly through an intermediary. However, additional levels of abstraction may be provided with an adapter providing a translation of the service provider api and a proxy redirecting the request to the adapter. In addition a connection broker server may provide a single access point for all requests. The connection broker would then determine the appropriate source and instantiate the necessary proxys and adapters.

In any event, the kiosk presents the kiosk authentication key to the content source machine. A complete, true and exact copy of the content and the content read only decryption key are retrieved from the content source computer and passed to the kiosk computer in step 735. The kiosk then receives and preferably caches the content and read only decryption key in step 740. The kiosk registry is updated in step 745 and a descriptor record of cached content is propagated to the appropriate peer computers in step 750. The process then moves to step 725 where the customer is shown the contents.

In step 755, the buyer pays the merchant for the content and, the kiosk initiates a payment transaction in which the seller account is credited and the merchant account is debited. In preferred embodiments, the payment transaction returns a confirmation key. In step 760, the merchant authorizes the kiosk to initiate a content replication process. In carrying out the content replication process, the kiosk submits a request for write key to the content source. The kiosk authentication key and the payment confirmation key are presented for authentication. The content write decryption key is retrieved from the source key store and passed to the buyer module. The buyer module decrypts the write enabled consent and copies content to buyer end use media, e.g., CD, DVD, tape and other removable storage media; PDAs, portable music players and other devices.

In accordance with a feature of the invention, the customer may choose to obtain free content from the kiosk 431-433 in the form of executable files that are in "superdistribution format". The preferred method of distributing content for no charge is through Player Centric Supderdistribution (PCS). PCS is a system, method and content packaging file format that implements superdistribution by integrating enabling technologies into the customer's content player. PCS recognizes that the customer experiences content through the content player of choice running on his computer or device. Thus this invention is designed to provide a simple player experience by seamlessly integrating the disparate technologies required for superdistribution.

Content Storage

In accordance with a preferred aspect of the invention, there are several methods and systems for storing content. The system anticipates that content sources require the flexibility to make content available to multiple distribution technologies such as web sites, Interactive TV, cell phones, PDAs etc. The content sources must be easily portable in order to exploit the declining cost of new telecommunications bandwidth as it becomes available. Portability is also important to take advantage of specialized data storage service providers. Flexibility of content portability and access by multiple technologies is provided by the system through several system design features.

In keeping with an aspect of the invention, there are several methods and systems for content storage. Virtualization of content location is one technique in adding flexibility and portability. Virtualization requires that the content source identifier used by the requesting client is a logical variable that can be resolved by the system. Distributed File Systems are another component used to accomplish these design goals. Distributed file systems permit a content requesting client to reference remote located data as if the data were local. Finally, various types of networked storage are utilized including: Network Attached Storage (NAS); Storage Area Networks (SAN); and IP addressable storage such as iSCSI. As with distributed systems, network storage permits the system to address remote content in the same manner as local content.

Virtualization occurs when the requesting program uses a logical name for content. The system then maps to the logical name to the actual physical location of the instance of content. The Registry when loaded with both logical name and physical name is one component that is used for virtualization. A standard api or adapter can consult the Registry to look up this mapping. The Registry may be read at system startup, or when the system detects a Registry update event. Once the Registry is read, Registry data may be loaded into a memory mapping table which can be used to translate logical names to physical names without the overhead of Registry database I/O.

Distributed networked file systems such as: NFS with NIS; Andrew; their derivatives and other similar systems that are technologies are useful for implementing virtualization and portability. The distributed file system gives the capability of accessing files on a remote machine, as if the file were located on the local machine. Distributed file systems may require configuration of the content source machine and loading of file system client on the machine requesting file system access.

Networked storage is a server less data storage appliance that provides many of the same benefits as a distributed networked file system. Appliances can be added or moved with little system intervention. Content can be added or deleted and such changes appear to devices requesting content as events on their local file system. In addition, there is no server to be reprogrammed upon the physical movement of the device.

Distributed file systems and networked storage frequently require initialization steps such as mounting or configuration. Such tasks can be programmed into adapters to handle communications with network storage devices and the distributed file system. This effectively hides the implementation details of how storage and file technology participates in implementing virtualization and portability. Under alternative embodiments, the system api can hide such details from content requesting clients.

Under some embodiments, changes in the file system, networked storage, content or content location are automatically, in real time, propagated throughout the system with no manual intervention or system disruption. Under this scenario, such physical changes are entered into the Registry at the time of the change. The Registry update is propagated to all instances of local copies of the Registry database. Local machines subscribing to Registry change events are notified of the change. The Local Registry change event causes an update to the in-memory mapping table. Clients accessing content read the memory map and are directed to the content, or content adapter to perform the retrieval Use of technologies embedded in lower levels of the system software provide virtualization and portability. Virtualization and portability enable devices to attach, move and detach with the system with no System Manager intervention and with no destabilization of the system. These design features enable a number of important architectures. Content can be stored on the seller's dedicated machine or the sellers storage service provider. Content can be stored on one or more kiosk that enter into such an arrangement with sellers. The System Manager can implement multiple stores of content in strategic locations such as on the premises, or on within close physical proximity of a large content provider. In combination with message brokerage, the System Manager can attach storage directly to a message broker server. These architectures enable new business models where the system provides content encoding/hosting services or alternatively the seller becomes intimately involved in the encoding/hosting of his digital inventory.

To provide a simple customer player experience requires a framework that will adapt to the changes in customer preferences while permitting the interoperability and easy substitution of various players, content encoding data formats, Digital Rights Management (DRM) systems and peer-to-peer network infrastructure. The player becomes the interface to manage the customer's superdistribution to other customers.

The player is also the interface into the Customer Relations Management (CRM) of customers distributed to.

DRM is a complex technology, which prohibits unauthorized access to intellectual property. Superdistribution, introduced by Mori and Kawahar, is distribution by passing partially useable content from customer to customer where any customer may fully activate the content by making a purchase. Both technologies are evolving, and have no common standards. In addition, neither technology has been fully adapted to peer-to-peer network architectures. What is needed is a solution which permits developing systems of superdistribution of DRM content through peer-to-peer networks that permit changing the DRM encoding type, superdistribution scheme or peer-to-peer architecture without impacting the customer player experience.

PCS largely resolves these issues by providing a flexible architecture, which permits components to change without modification of the user experience. The PCS software architecture is designed to operate on a peer-to-peer network architecture and provides a flexible and open standard that permits interoperability of participants. This invention improves upon the Mori and Kawahara design by eliminating the need for specialized "S-Box" digitally protected hardware.

The PCS file format contains an executable header, an updateable data section and a playable content section. The updateable data section contains customer identifiers and an indicator of the playable content encoding format. Following the data section is the playable digitized content. Upon execution of the PCS formatted file, the executable header reads the data section indicator of the encoding format and searches the local computer for the player appropriate for the content format. The executable may download an appropriate player if not found on the local machine. Once the appropriate player is located, the executable will download modules to reconfigure and update the player with new functionality to manage the customers sharing of content. The executable may alternatively download another player, preconfigured with customer sharing functionality.

The PCS system is a system of superdistribution of digital content through a customer online content player. The PCS system components consist of a) an encoder to create a file of digital content in PCS format such that the file is playable and updateable with a customer identifier; b) utilities to update the PCS content file with customer identifiers; c) online customer content players and upgrades to existing players with the capability to update a content file with customer identifiers and the capability to share a content file with other customers and the capability of file sharing customer management functionality; d) Service Providers to accept payment for access to PCS file playable content and to provide content file access keys.

The PCS System uses a method of superdistribution of digital content through a customer online content player. The customer first selects content for use. The executable header in the PCS formatted file then downloads another player or modifies the current player. The player then displays content file update, content file sharing and content file sharing customer management functionality. The customer then plays the content. If the customer decides to share the content, the customer uses the configured player to update the instance of content with the unique customer identifier such that customer identifiers of previous customers of the instance of content are maintained. At some point a customer purchases the content and a Service Provider provides content access keys. The Service Provider then compensates all previous users of content Unlike a playable file which upon clicking, the operating system notices the file suffix and calls the appropriate player, the superdistribution file format is itself an executable. Upon clicking the superdistribution formatted file, the executable file header will search the local system for the appropriate player for the playable content within the file The executable segment of the superdistribution formatted file will reconfigure the player with superdistribution functionality. Under alternative embodiments, the executable portion of the file may access remote code to reconfigure the player or another player is downloaded, preconfigured with superdistribution functionality Panels, buttons, list boxes and other user interface tools are included in a player with superdistribution functionality. The player becomes a control center for: updating the superdistribution file with the customer's unique identifier; list management for sending the content to other customers; Customer Relationship Management for managing information about and interaction with customers.

Once the customer decides to share the content with others he will use the superdistribution file update functionality to update the file with his unique customer identifier. Under some embodiments, an email address may suffice for a unique customer id.

The file update function may add the last customer to an updateable area of the superdistribuiton formatted file which maintains a record of all customers who have shared that one instance of content. Under another embodiment, the file update function will update a central data base with the unique customer id associating the id with the file. To share the content, the customer sends the same copy of the updated file to his entire mailing list.

Under an alternative embodiment of file sharing, the customer may upload the updated file to a service provider. Instead of emailing the file to his mailing list, the customer may email his mailing list the url of where his customers can download a copy of the file. The service provider may be a machine dedicated to receiving and downloading superdistribution file. The service provider may be the kiosk itself.

Upon purchase of the content, a service provider provides the customers with decryption keys to use the content. All customers who participated in distribution become eligible for compensation.

Obviously, numerous modifications and variations of the present invention are possible in light of the above teachings. It is therefore to be understood that within the scope of the appended claims, the invention may be practiced otherwise than as specifically described herein.

This is one example and embodiment of the digital content and distribution content access service of the present invention. This is the Web Service Definition Language (WSDL), which describes and defines an exemplary embodiment. The content access service embodies the operations required to communicate content and information between machines. The service implementation details can vary.

```
<message name ="ContentRequestMessage">
<part name = "ReguestorAccountNumber"      type="xs:string"/>
<part name = "ContentSupplierAccountNumber"   type="xs:string"/>
<part name ="DiskSetNumber"                type="xs:string"/>
<part name="DiskNumber"                    type="xs:string"/>
<part name="TrackNumber"                   type="xs:string"/>
<part name="RequestorIDKey"                type="xs:string"/>
</message>
<message name = "ContentReplyMessage">
<part name="ContentData"                   type="xsd:binaryBase64"/>
```

```
</message>
<message name ="ContentKeyRequestMessage">
<part name = "ReguestorAccountNumber"       type="xs:string"/>
<part name = "ContentSupplierAccountNumber" type="xs:string"/>
<part name ="DiskSetNumber"                 type="xs:string"/>
<part name="DiskNumber"                     type="xs:string"/>
<part name="TrackNumber"                    type="xs:string"/>
<part name="RequestorIDKey"                 type="xs:string"/>
</message>
<message name = "ContentKeyReplyMessage">
<part name="ContentKeyData"          type="xs:string"/>
</message>
<message name ="PaymentRequestMessage">
<part name = "RequestorAccountNumber"       type="xs:string"/>
<part name = "ContentSupplierAccountNumber" type="xs:string"/>
<part name ="DiskSetNumber"                 type="xs:string"/>
<part name="DiskNumber"                     type="xs:string"/>
<part name="TrackNumber"                    type="xs:string"/>
<part name="RequestorIDKey"                 type="xs:string"/>
<part name = "TransactionAccountNumber" type="xs:string"/>
<part name="Transaction Type"           type="xs:string"/>
<part name="TransactionAmount"          type="xs:string"/>
<part name="Timestamp"                  type="xs:string"/>
</message>
<message name = "PaymentReplyMessage">
<part name = "RequestorAccountNumber"  type="xs:string"/>
<part name = "ContentSupplierAccountNumber" type="xs:string"/>
<part name = "TransactionAccountNumber" type="xs:string"/>
<part name = "TransactionType"          type="xs:string"/>
<part name = "TransactionAmount"        type="xs:string"/>
<part name = "ConfirmationCode"         type="xs:string"/>
<part name = "PaymentProcessorIDCode"   type="xs:string"/>
<part name = "PaymentProcessorIDKey"    type="xs:string"/>
<part name = "TransactionTimeStamp"     type="xs:string"/>
<message name/>
<message name ="RegistryLookupRequestMessage">
<part name = "ReguestorAccountNumber"       type="xs:string"/>
<part name = "ContentSupplierAccountNumber" type="xs:string"/>
<part name ="DiskSetNumber"                 type="xs:string"/>
<part name="DiskNumber"                     type="xs:string"/>
<part name="TrackNumber"                    type="xs:string"/>
<part name="RequestorIDKey"                 type="xs:string"/>
</message name>
<message name ="RegistryLookupReplyMessage">
<part name = "ReguestorAccountNumber"       type="xs:string"/>
<part name = "ContentSupplierAccountNumber" type="xs:string"/>
<part name ="DiskSetNumber"                 type="xs:string"/>
<part name="DiskNumber"                     type="xs:string"/>
<part name="TrackNumber"                    type="xs:string"/>
<part name="RequestorIDKey"                 type="xs:string"/>
<part name="ContentLocationURI"             type="xs:string"/>
<part name="ContentKeyLocationURI"          type="xs:string"/>
<part name="ContentAdapterURI"              type="xs:string"/>
<part name="ContentKeyAdapterURI"           type="xs:string"/>
<part name="ContentAdapterRequired"         type="xs:boolean"/>
<part name="ContentKeyAdapterRequired"      type="xs:boolean"/>
<part name = "LookupStatusCode"             type="xs:string"/>
<part name = "RegistryIDCode"               type="xs:string"/>
<part name = "RegistryIDKey"                type="xs:string"/>
<part name = "TimeStamp"                    type="xs:string"/>
</message name>
<message name ="RegistryUpdateRequestMessage">
<part name = "ReguestorAccountNumber"       type="xs:string"/>
<part name = "ContentSupplierAccountNumber" type="xs:string"/>
<part name ="DiskSetNumber"                 type="xs:string"/>
<part name="DiskNumber"                     type="xs:string"/>
<part name="TrackNumber"                    type="xs:string"/>
<part name="ContentLocationURI"             type="xs:string"/>
<part name="ContentKeyLocationURI"          type="xs:string"/>
<part name="ContentAdapterURI"              type="xs:string"/>
<part name="ContentKeyAdapterURI"           type="xs:string"/>
<part name="ContentAdapterRequired"         type="xs:boolean"/>
<part name="ContentKeyAdapterRequired"      type="xs:boolean"/>
<part name="RequestorIDKey"                 type="xs:string"/>
<part name="UpdateTransactionType"          type="xs:string"/>
<part name="UpdateTransactionMode"          type="xs:string"/>
</message name>
<message name ="RegistryUpdateReplyMessage">
<part name = "ReguestorAccountNumber"       type="xs:string"/>
<part name = "ContentSupplierAccountNumber" type="xs:string"/>
<part name="DiskSetNumber"                  type="xs:string"/>
<part name="DiskNumber"                     type="xs:string"/>
<part name="TrackNumber"                    type="xs:string"/>
<part name="RequestorIDKey"                 type="xs:string"/>
<part name="ContentLocationURI"             type="xs:string"/>
<part name="ContentKeyLocationURI"          type="xs:string"/>
<part name="ContentAdapterURI"              type="xs:string"/>
<part name="ContentKeyAdapterURI"           type="xs:string"/>
<part name="ContentAdapterRequired"         type="xs:boolean"/>
<part name="ContentKeyAdapterRequired"      type="xs:boolean"/>
<part name = "UpdateStatusCode"             type="xs:string"/>
<part name = "RegistryIDCode"               type="xs:string"/>
<part name = "RegistryIDKey"                type="xs:string"/>
<part name = "TimeStamp"                    type="xs:string"/>
<part name="UpdateTransactionType"          type="xs:string"/>
<part name="UpdateTransactionMode"          type="xs:string"/>
</message name>
</message>
<portType name="ContentAccessService">
<operation name="ContentRetrieve">
<input message="ContentRequestMessage">
<output message="ContentReplyMessage">
</operation>
<operation name="ContentKeyRetrieve">
<input message="ContentRequestKeyMessage">
<output message="ContentReplyKeyMessage">
</operation>
<operation name="PaymentTransaction">
<input message="PaymentRequestMessage">
<output message="PaymentReplyMessage">
</operation>
<operation name="RegistryLookup">
<input message="RegistryLookupRequestMessage">
<output message="RegistryLookupReplyMessage">
</operation>
<operation name="RegistryUpdate">
<input message="RegistryUpdateRequestMessage">
<output message="RegistryUpdateReplyMessage">
</operation>
<binding type=" ContentAccessService" name= "ContentAccessBinding">
    <soap:binding style="document"
transport="http://schemas.xmlsoap.org/soap/http" />
    <operation>
    <soap:ContentRetrieve>
soapAction= get_content_binding_variable/>
    <input>
V.      <soap:body use="literal"/>
    </input>
    <output>
    <soap:body use="literal"/>
    </output>
    </operation>
    <operation>
    <soap:ContentKeyRetrieve>
soapAction= get_content_key_binding_variable />
    <input>
VI.     <soap:body use="literal"/>
    </input>
    <output>
    <soap:body use="literal"/>
    </output>
    </operation>
    <operation>
    <soap:PaymentTransaction>
soapAction= do_payment_binding_variable >
    <input>
VII.    <soap:body use="literal"/>
    </input>
    <output>
    <soap:body use="literal"/>
    </output>
    </operation>
    <operation>
    <soap:RegistryLookup>
soapAction= registry_lookup_binding_variable >
    <input>
VIII.   <soap:body use="literal"/>
    </input>
    <output>
```

-continued

```
<soap:body use="literal"/>
</output>
</operation>
<operation>
<soap:RegistryUpdate>
soapAction= registry_update_binding_variable >
<input>
IX.    <soap:body use="literal"/>
</input>
<output>
<soap:body use="literal"/>
</output>
</operation>
</binding>
```

What is claimed is:

1. A system for the distribution of digital content through a communications computer network, said network comprising:

a plurality of computers connected to each other including at least a first computer, a second computer and a third computer each employing an open architecture programmed to provide a peer to peer communications capability;

said first, second and third computers of said computer network each being identified in said network by a unique digital certificate, said third computer of said plurality of linked computers of said network being programmed to function in said computer network as an administration server for said computer network;

a descriptor record, said descriptor record listing digital content associated with said first computer available for sale to said other computers of the plurality, wherein said third computer is programmed to receive said descriptor record from said first computer and to authorize said first machine to offer the content listed in said descriptor record over the network, to generate a registry listing the authorized content from said descriptor record received from said first computer, and to propagate said registry to at least said second computer of the plurality;

wherein said third computer is further programmed to receive a request from said second computer to download content listed in said registry associated with said first computer described in said registry; to determine if said request for content from said second computer is authorized; and to authorize the transfer of digital content associated with said first computer to said second computer.

2. The computer system of claim 1 wherein said administration server computer is programmed to generate, assign, and authenticate the digital certificates for said plurality of computers in the computer network.

3. The computer system of claim 1 wherein said second computer of the network is programmed to search, select, view and download digital content associated with said first computer listed in a registration database.

4. The computer system of claim 3 wherein said third computer is programmed to receive descriptor records associated with a plurality of computers on the network; and to generate a registration database based on the plurality of descriptor records received from said plurality of computers on the network and to propagate the registration database to a plurality of computers on the network.

5. The computer system of claim 4 wherein said third computer is programmed to update said registration database in real time.

6. The computer system of claim 3 wherein said second computer is a kiosk.

* * * * *